US008589435B2

(12) United States Patent
Chan et al.

(10) Patent No.: US 8,589,435 B2
(45) Date of Patent: Nov. 19, 2013

(54) METHOD, SYSTEM AND PROGRAM FOR SIMPLIFYING DATA FLOW IN A STATEMENT WITH SEQUENCED SUBEXPRESSIONS

(75) Inventors: Petrus Kai Chung Chan, Richmond Hill (CA); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 10/864,005

(22) Filed: Jun. 8, 2004

(65) Prior Publication Data
US 2006/0004863 A1 Jan. 5, 2006

(51) Int. Cl.
*G06F 7/00* (2006.01)

(52) U.S. Cl.
USPC .......................................... 707/774; 707/775

(58) Field of Classification Search
USPC .................................................. 707/774, 769
See application file for complete search history.

(56) References Cited

U.S. PATENT DOCUMENTS

| 5,367,675 | A | | 11/1994 | Cheng et al. ............ 395/600 |
| 5,546,576 | A | * | 8/1996 | Cochrane et al. ............ 707/2 |
| 6,128,612 | A | | 10/2000 | Brereton et al. ............ 707/4 |
| 6,341,277 | B1 | | 1/2002 | Coden et al. ............ 707/2 |
| 6,529,896 | B1 | | 3/2003 | Leung et al. ............ 707/2 |
| 6,604,102 | B2 | | 8/2003 | Klein et al. ............ 707/4 |
| 2002/0038313 | A1 | | 3/2002 | Klein et al. ............ 707/200 |
| 2002/0143746 | A1 | | 10/2002 | Levy et al. ............ 707/2 |
| 2003/0055807 | A1 | | 3/2003 | Lomet ............ 707/1 |
| 2003/0120682 | A1 | | 6/2003 | Bestgen et al. ............ 707/41.1 |
| 2003/0167258 | A1 | | 9/2003 | Koo et al. ............ 707/2 |
| 2003/0200214 | A1 | | 10/2003 | Doole et al. ............ 707/8 |

OTHER PUBLICATIONS

Rischert, Oracle SQL, 2003, Prentice Hall, $2^{nd}$ Edition, pp. 363-365.*

* cited by examiner

*Primary Examiner* — Robert Beausoliel, Jr.
*Assistant Examiner* — Nirav K Khakhar
(74) *Attorney, Agent, or Firm* — Sawyer Law Group, P.C.

(57) ABSTRACT

Data flow in a database statement for a database management system having memory storing a database is simplified. The statement has at least two sequenced subexpressions, evaluation of which is driven by a sequencing operation. A reference to a first sequenced subexpression in a second sequenced subexpression subsequent to the first sequenced subexpression is determined. The reference affirming evaluation of the first sequenced subexpression is determined. A first evaluation order for conflicting table accesses between the first sequenced subexpression and other table accesses in the statement is determined. A second evaluation order between the other table accesses and the determined reference is also determined. The sequencing operation for the first sequenced subexpression is modified based on a sequential arrangement of the determined reference and the first sequenced subexpression according to the first evaluation order and the second evaluation order.

6 Claims, 5 Drawing Sheets

METHOD, SYSTEM AND PROGRAM FOR SIMPLIFYING DATA FLOW IN A STATEMENT WITH SEQUENCED SUBEXPRESSIONS

FIELD OF THE INVENTION

The present invention relates to the field of database queries, and more specifically to a method, system and program for simplifying data flow in a statement with sequenced subexpressions.

BACKGROUND OF THE INVENTION

A database management system (DBMS) is a computer based system that stores data in tables and retrieves such stored data. Storage, retrieval and removal of data is accomplished using statements provided to the DBMS in a database query language such as Structured Query Language (SQL). The statement is incorporated into the DBMS, by such means as parsing, where it is converted into an internal representation that provides a summary of the semantic relationships of the statement for optimization purposes. This internal representation is optimized to provide an efficiently executable plan for the statement which specifies the manner in which data is to be retrieved or modified.

The internal representation of a statement has sequencing operation when there are modifying operations (e.g. insert, delete or update) in the statement and there is an evaluation order in which these modifying operations and reading operations are to be executed for the purpose of satisfying semantic specifications of the statement. For example, the statement may be a query that includes multiple subexpressions using a WITH clause therein, each of which may produce some result that is used to form the arguments of a main SELECT statement. Each of the subexpressions in the WITH clause, also known as a common table expression, may be ordered such that consistent results are produced by the statement over multiple execution iterations. Such an evaluation order may be used, for example, when there are modifying operations (e.g. insert, delete or update) in any of the subexpressions that could potentially change evaluation results of the statement. A sequencing operation drives evaluation of each of the subexpressions according to the evaluation order. Another example of a subexpression is a modifying statement (e.g. insert, delete or update) whose internal representation uses a compilation of system-generated subexpressions to satisfy the semantic specifications of a table being modified. The evaluation order of such a subexpressions and the original modifying operation is controlled by the sequencing operation. Such subexpressions whose evaluation order is controlled by a sequencing operation are referred to as sequenced subexpressions.

In a graphical depiction of the internal representation, each of the subexpressions and the sequencing operation are represented with data flows between them. If the data flow in the graph is oriented vertically, the sequencing operation has data flowing arcs showing the flow of data over each of the subexpressions. Each arc and subexpression combination (possibly formed of multiple arcs and subexpressions) that stems from the sequencing operation is considered to be a sequenced subgraph.

Any operation or command with more than one data flowing arc over it is known as a common subexpression. In a common subexpression results of one operation are used by another operation resulting in temporary storage of the intermediate result to maintain data content consistency. Thus, extra storage is used during execution of the statement and execution time increases.

SUMMARY OF THE INVENTION

Data flow in a database statement for a database management system having memory storing a database is simplified. The statement has at least two sequenced subexpressions, evaluation of which is driven by a sequencing operation. A reference to a first sequenced subexpression in a second sequenced subexpression subsequent to the first sequenced subexpression is determined. The reference affirming evaluation of the first sequenced subexpression. A first evaluation order for conflicting table accesses between the first sequenced subexpression and other table accesses in the statement is determined. A second evaluation order between the other table accesses and the determined reference is also determined. The sequencing operation for the first sequenced subexpression is modified based on a sequential arrangement of the determined reference and the first sequenced subexpression according to the first evaluation order and the second evaluation order.

In accordance with an aspect of the present invention there is provided for a database management system having memory storing a database, a method of simplifying data flow in a database statement having at least two sequenced subexpressions, evaluation of sequenced subexpressions in the statement being driven by a sequencing operation, the method comprising: determining a reference to a first sequenced subexpression in a second sequenced subexpression subsequent to the first sequenced subexpression that affirms evaluation of the first sequenced subexpression; determining a first evaluation order for conflicting table accesses between the first sequenced subexpression and other table accesses in the statement; determining a second evaluation order between the other table accesses and the determined reference; modifying the sequencing operation for the first sequenced subexpression based on a sequential arrangement of the determined reference and the first sequenced subexpression according to the first evaluation order and the second evaluation order.

In accordance with an aspect of the present invention there is provided for a database management system having memory storing a database, a system for simplifying data flow in a database query statement having at least two sequenced subexpressions, evaluation of sequenced subexpressions in the statement being driven by a sequencing operation, the system comprising: a conflict mechanism for determining a reference to a first sequenced subexpression in a second sequenced subexpression subsequent to the first sequenced subexpression according to an evaluation order that affirm evaluation of the first sequenced subexpression; an evaluation order mechanism for determining a first evaluation order for conflicting table accesses between the first sequenced subexpression and other table accesses in the statement and determining a second evaluation order between the other table accesses and the determined references; a sequence modification mechanism for modifying the sequencing operation comprising a reference modification mechanism modifying the sequencing operation for the first sequenced subexpression based on a sequential arrangement of the determined reference and the first sequenced subexpression according to the first evaluation order and the second evaluation order; and a controller in communication with the conflicting mechanism, the evaluation order mechanism and the sequence modification mechanism for coordinating the process for simplifying data flow.

In accordance with an aspect of the present invention there is provided for a data processing system having memory storing a database, a computer program product for simplifying data flow in a database statement having at least two sequenced subexpressions, evaluation of sequenced subexpressions in the statement being driven by a sequencing operation, the computer program product comprising: a medium adapted to transport computer executable code comprising: computer executable code for determining a reference to a first sequenced subexpression in a second sequenced subexpression subsequent to the first sequenced subexpression that affirms evaluation of the first sequenced subexpression; computer executable code for determining a first evaluation order for conflicting table accesses between the first sequenced subexpression and other table accesses in the statement; computer executable code for determining a second evaluation order between the other table accesses and the determined reference; computer executable code for modifying the sequencing operation for the first sequenced subexpression based on a sequential arrangement of the determined reference and the first sequenced subexpression according to the first evaluation order and the second evaluation order.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS OF THE PRESENT INVENTION

The following detailed description of the embodiments does not limit the implementation of the embodiments to any particular computer programming language. The computer program product may be implemented in any computer programming language provided that the operating system provides the facilities that support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
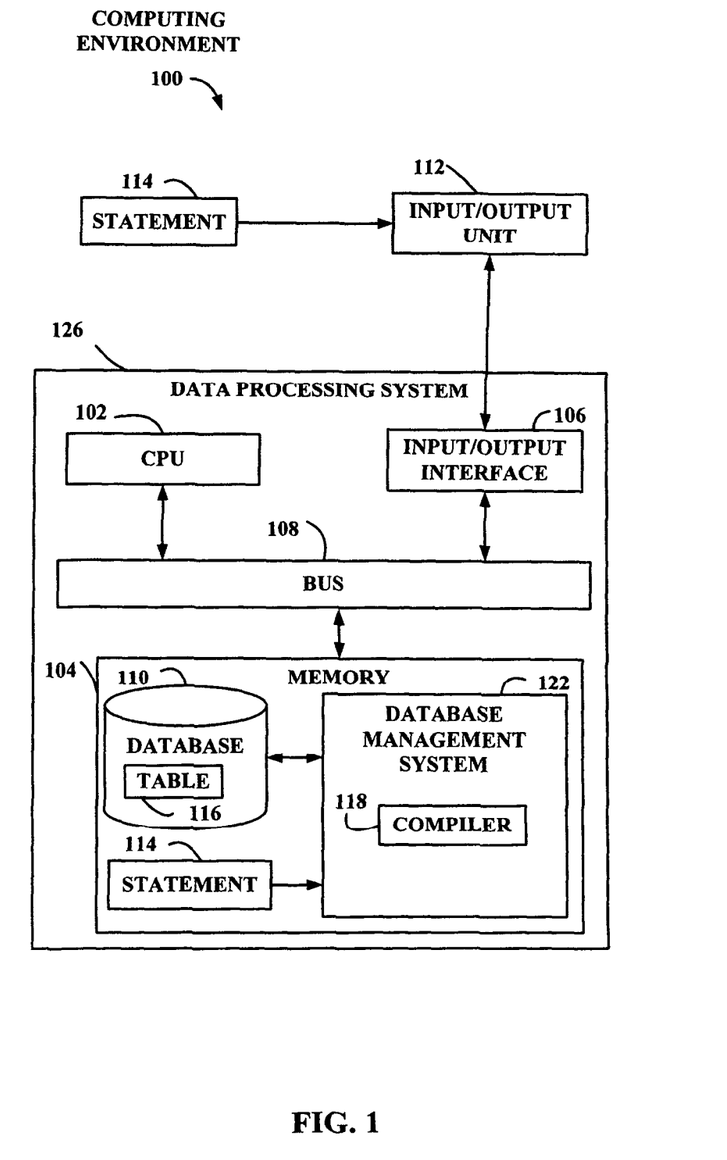
FIG. 1 is an exemplary database management system (DBMS)

FIG. 1 illustrates a configuration of a computing environment 100 comprising a data processing system 126 in which an embodiment of a database management system 122 may be implemented.

The data processing system 126 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112 in the computing environment 100.

The CPU 102 can be a commercially available CPU or a customized CPU suitable for operations described herein. Other variations of the CPU 102 can include a plurality of CPUs interconnected to coordinate various operations and functions. The data processing system 126 serves as an apparatus for performing the present method by the CPU 102 executing the present invention.

The memory 104 also includes the database management system 122 and a database 110 with multiple tables 116 (only one of which is shown for illustration purposes) that hold information. The database management system 122 comprises a compiler 118.

The information in the tables 116 may be accessed by a statement 114 that is received by the input/output unit 112 and is retained in memory 104 after entry into the data processing system 126. The statement 1 14 may be presented in an SQL format that is compiled by the compiler 118 to form an internal representation which is used to generate an execution plan to access the database 110 and the tables 116 therein for extraction of the requested information.

The compiler 118 processes the statement 114 by first lexing, parsing and semantically checking the statement 114. The compiler 118 then converts the statement 114 into an internal representation, denoted as a query graph model, which is a command data-structure that summarizes the semantic relationships of the statement 114. The query graph model and the process of obtaining such may be according to the method disclosed in U.S. Pat. No. 5,546,576, incorporated herein by reference. During the formation of the internal representation from the statement 114, the compiler 118 modifies the statement 114 to improve performance during execution.

The query graph model may be optimized to merge one or more nodes where it is possible by removing data-flow arcs, that interconnect these nodes. Such optimization of the query graph model usually re-writes the query graph model to remove nodes and data flowing arcs.

The statement 114 may comprise, for example, a SELECT statement with multiple subexpressions specified through a WITH clause, each of which may produce some result that is used to form the arguments of the SELECT statement. These subexpressions in the WITH clause, also referred to as common table expressions, specify various conditions that are applicable only to the current statement. A common table expression defines one or more temporary views that are only effective during the processing of the current SQL statement and can be referenced by subsequent table expressions or the main SELECT statement.

In order to produce consistent results for the statement 114 containing a modification operation, an evaluation order of the subgraphs is sequenced to drive evaluation thereof and ensure that the subexpressions are evaluated in an order that provides semantic correctness.

The statement 114 may also be a modifying statement whose internal representation relies of compilation of system generated subexpressions to satisfy the semantic specifications of the table 116 being modified. The evaluation order of such subexpressions and the original modifying operations is controlled by the sequencing operation.

In the query graph model of the internal representation, the sequencing operation has data flowing arcs over each sequenced subgraph representing a sequenced subexpression. Any operation or command with more than one data flowing arc over it (common subexpression) results in data of the operation flowing to more than one operation through the connecting data flowing arcs.

The present invention may be embodied in the compiler 118. Alternatively, the present invention may be provided as an extension of the functionality of the compiler 118. The present invention may be embodied in a program stored in, for example, the memory 104. Alternatively, the present invention may be recorded on any type of recording medium such as a magnetic disk or an optical disk. The present invention recorded on such a recording medium is loaded into the memory 104 of the data processing system 126 via the input/output unit 112 (e.g. a disk drive).

Figure 2A:
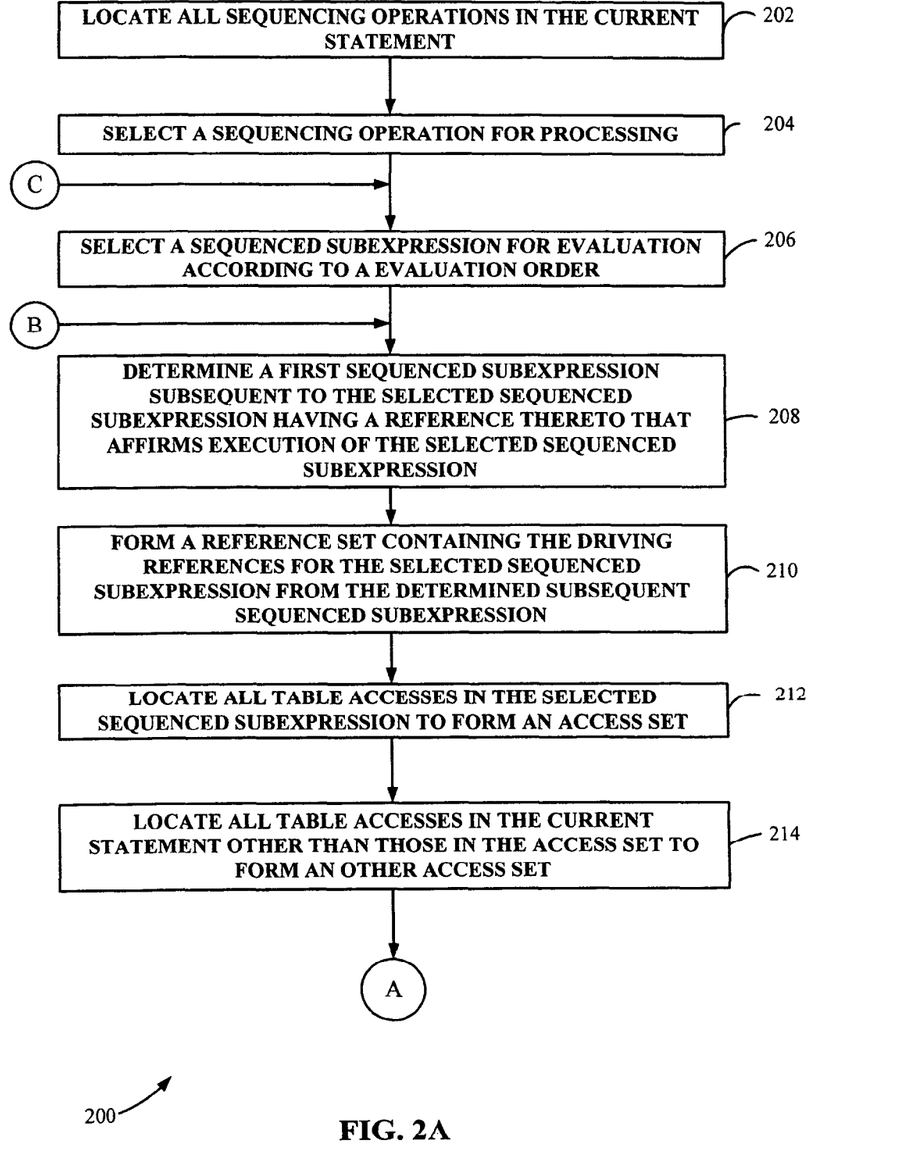
FIG. 2A-C illustrates operations of a compiler of the DBMS of FIG. 1 that direct a data processing system to simplify data flow in a statement with sequenced subexpressions.
Figure 2B:
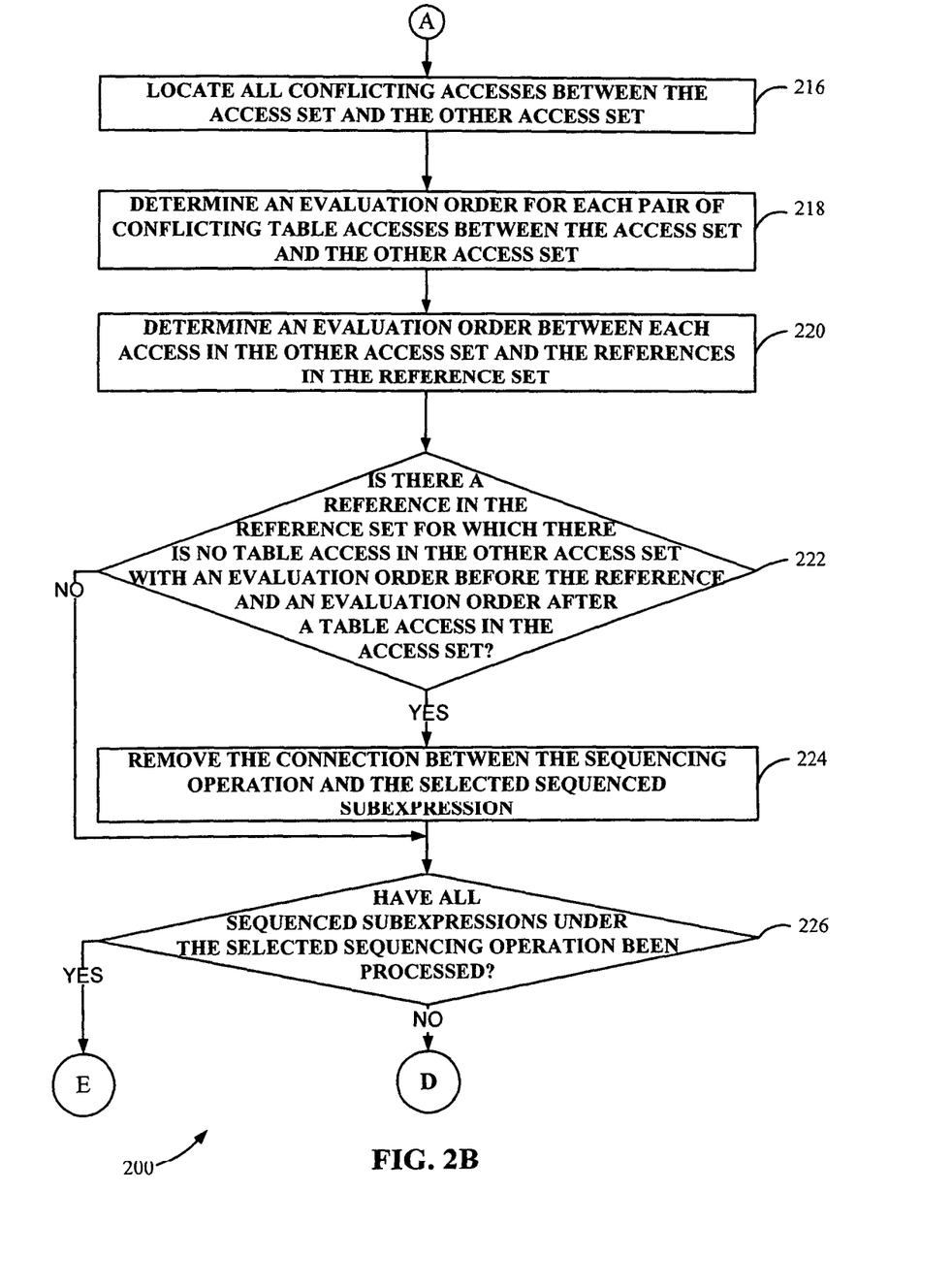
Figure 2C:
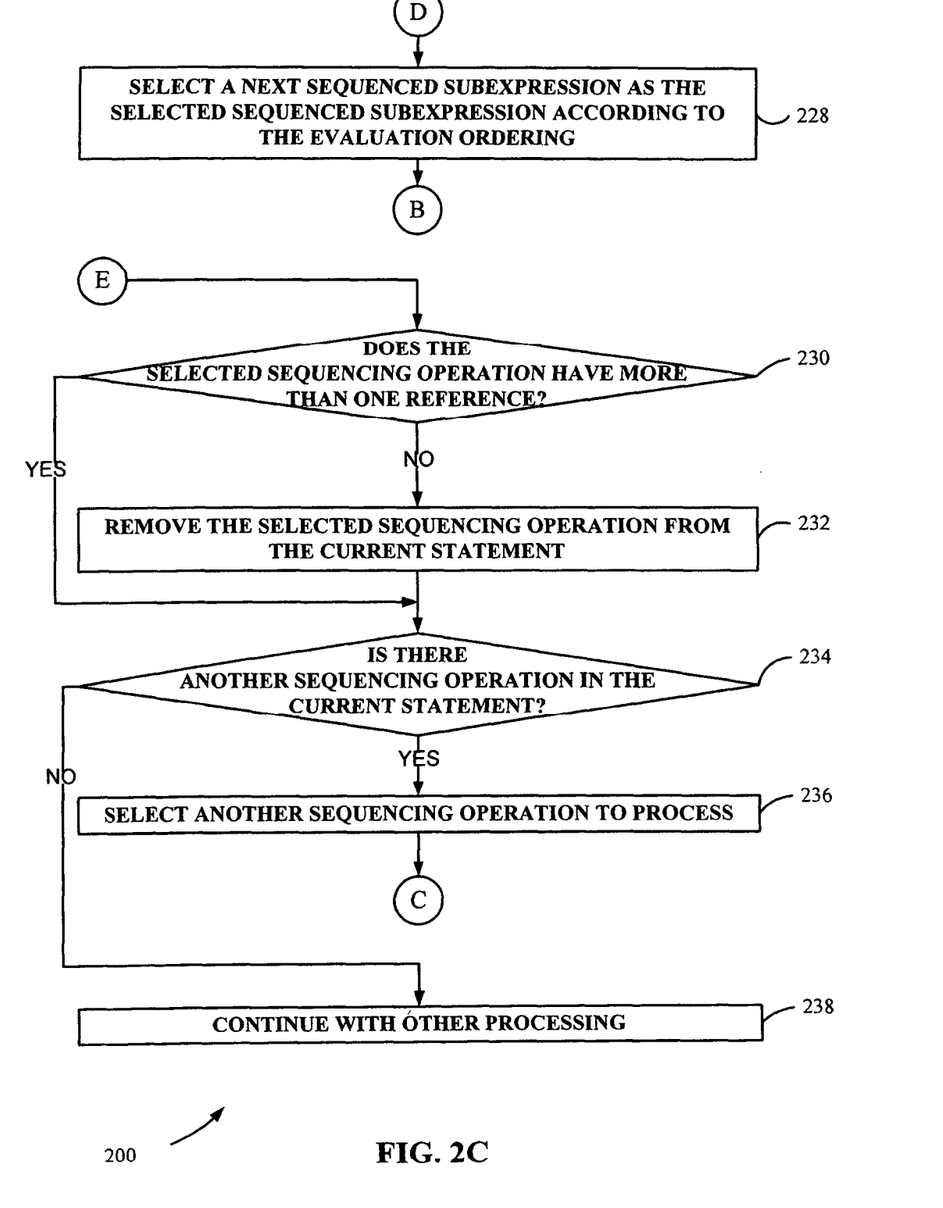

FIG. 2A-C illustrates operations 200 of the compiler 118 of the DBMS 122 of FIG. 1 that direct the data processing system 126 to simplify data flow in the statement 114 having multiple subexpressions that include at least one modification operation. Such a modification operation may be an insert operation, an update operation, a delete operation or any other operation that modifies the table 116. Each of the multiple subexpressions in the current statement belongs to a sequencing operation that is determined so that the final result of the current statement will satisfy the semantic specifications of the statement. For example, for a SELECT statement using a WITH clause, the final result of the statement will be the same as if the subexpressions represented are processed in the order in which they appear in the current statement. All sequencing operations in the current statement are located in step 202.

The subexpressions considered in the operations 200 are those that are sequenced but do not cycle among the subgraphs representing the subexpressions. There is no cycle if a traversal of the directed data flowing arcs of the graph does not revisit an operation that has already been visited.

One of the located sequencing operations is selected in step 204 for processing. The sequencing operations advance processing each sequenced subexpression in an order that is specified by the semantics of the statement 114. The sequencing operation references each sequenced subexpression in the current statement. Such referencing produces a data flowing arc in the query graph model over the sequencing operation at the top of the sequenced subgraphs representing the subexpressions and some data will be passed from the subgraphs (graphically depicted lower than the sequencing operation) to the sequencing operation. Thus, there is data in the sequenced subexpressions that is referenced by the sequencing operation, and potentially by other subsequent sequenced subexpressions.

Each current statement may contain multiple sequenced subexpressions whose order of evaluation is specified by an evaluation order based on the semantic specification of the statement. For a SELECT statement containing a WITH clause, it is the order in which each subexpression appears in the WITH clause. For a modifying statement, it is the system generated evaluation order as specified by semantics. A sequenced subexpression is selected in step 206 according to the evaluation order.

A first sequenced subexpression in the selected sequencing operation that is subsequent to the selected sequenced subexpression, has a reference thereto and affirms execution of the selected sequenced sub expression is determined in step 208. Each sequenced subexpression that is subsequent to the selected sequenced subexpression is considered in an ascending order as specified in the sequencing operation (i.e. evaluation order).

In order to determine if a particular sequenced subexpression affirms execution of the selected sequenced subexpression, the query graph model is considered. In the case where the data flowing arcs are presented vertically and the sequencing operation is considered to be at the top of the query graph model, top-down graph traversal may be performed. That is, data flows from the top of the subgraph representing the subsequent sequenced subexpression are examined to find a data flow to the selected sequenced subexpression. If the selected sequenced subexpression is considered to be a descendant of the subsequent sequenced subexpression (in the query graph model) and each segment of the data flow path can affirm evaluation of lower subexpressions in the graph to which it is connected then the particular subexpression is considered to affirm execution of the selected sequenced subexpression. The references that form the segments of the data flow path are the driving references of the subsequent sequenced subexpression.

The evaluation of the selected sequenced subexpression is affirmed by a subsequent sequenced subexpression if the subgraph representing such a subsequent sequenced subexpression contains a reference thereto (represented in the query graph model as a data flowing arc) and all arcs in the path from the top of the subgraph representing the subsequent sequenced subexpression to such a reference affirm the evaluation of the operation below it in the path. An arc affirms the evaluation of the operation below if it has a pre-defined execution order in the sequencing operation that contains the arc and the arc is ordered first or when the arc has no pre-defined execution order but all arcs other than the given arc return non-empty results.

The first subsequent sequenced subexpression is searched in step 210 to determine the driving references therein for the selected sequenced subexpression. These references form a reference set.

The table accesses in the selected sequenced subexpression are identified in step 212. All table accesses in the current statement, other than those in the access set (i.e. table accesses in the selected sequenced subexpression), are located in step 214 to form another access set.

All conflicting accesses between the access set and the other access set are located in step 216. A conflicting access occurs when a table is accessed at two separate points in the current statement (i.e. one access in the access set and another access in the other access set both of which are to the same table) and when the accesses are of a conflicting type. Two accesses have a conflicting type when one access writes to the table and the other accesses reads the table or when both accesses write to the table. The conflicting table references may be determined by techniques such as those presented in U.S. Pat. Nos. 5,546,576 and 5,873,075, both of which are herein incorporated by reference. For example, a table(s) reference that writes to the table (e.g. an update of the table as placed in one of the subexpressions) and a table reference that reads the table (e.g. a selection in another subexpression) are conflicting table references.

An evaluation order is determined for each pair of conflicting accesses determined in step 216 from the access set and the other access set in step 218. The evaluation order is an indication of the location of an access in the current statement with respect to another access for the purposes of evaluation of the access. If the accesses are evaluated in the order in which they appear in the current statement then the evaluation order indicates whether a particular access appears in the current statement before another access, and thus will be evaluated before the other access.

An evaluation order is determined in step 220 between each access in the other access set and the references to the selected sequenced subexpression in the reference set. That is, those tables that are accessed in the other access set and the references to the selected sequenced subexpression in the reference set are identified and an evaluation order for each pair is determined.

Step 222 evaluates whether or not there is a reference to the selected sequenced subexpression in the reference set that does not have a table access in the other access set separating the reference from the table accesses identified in step 212. The reference to the selected sequenced subexpression in the reference set and the table accesses in the selected sequenced subexpression are considered to be sequential if there is no intervening access that conflicts. For the selected sequenced subexpression and the selected sequencing operation to be modified then the table accesses and the reference should not be separated by another access of a conflicting type. Step 222 searches for a reference to the selected sequenced subexpression in the reference set that does not have a table access in the other access set with an evaluation order before the reference and an evaluation order after a table access in the access set.

If there is a reference to the selected sequenced subexpression in the reference set satisfying the criteria identified in step 222 then the current statement is modified in step 224 to remove reference to the selected sequenced subexpression from the selected sequencing operation. Each of the references in the reference set is denoted in step 224 as affirming evaluation of the selected sequenced subexpression. Thus, when other sequenced subexpressions are processed, the references that have affirmed evaluation of other sequenced subexpression previously processed are known.

If such a reference is not identified in step 222 or the selected sequencing operation is modified in step 224, step 226 determines if all sequenced subexpression in the selected sequencing operation have been evaluated. If not all sequenced subexpression have been evaluated then the next sequenced subexpression in the selected sequencing operation according to the evaluation order is selected as the selected sequenced subexpression in step 228. After step 228 then step 208 to 226 are repeated.

If all sequenced subexpression in the selected sequencing operation have been evaluated as determined in step 226 then step 230 determines if there is more than one reference in the selected sequencing operation. If there is only one reference in the selected sequencing operation then the current statement can be modified in step 232 to remove the selected sequencing operation therefrom. If there is more than one reference in the selected sequencing operation as determined in step 230 the processing of the selected sequencing operation finishes or after the selected sequencing operation has been removed in step 232, it is determined in step 234 if there is a sequencing operation in the current statement that has not been processed. If there is a sequencing operation that has not been processed then step 236 selects the next sequencing operation in the statement and steps 206 to 234.

After all sequencing operations have been processed the compiler 118 continues with other processing in step 238.

Figure 3:
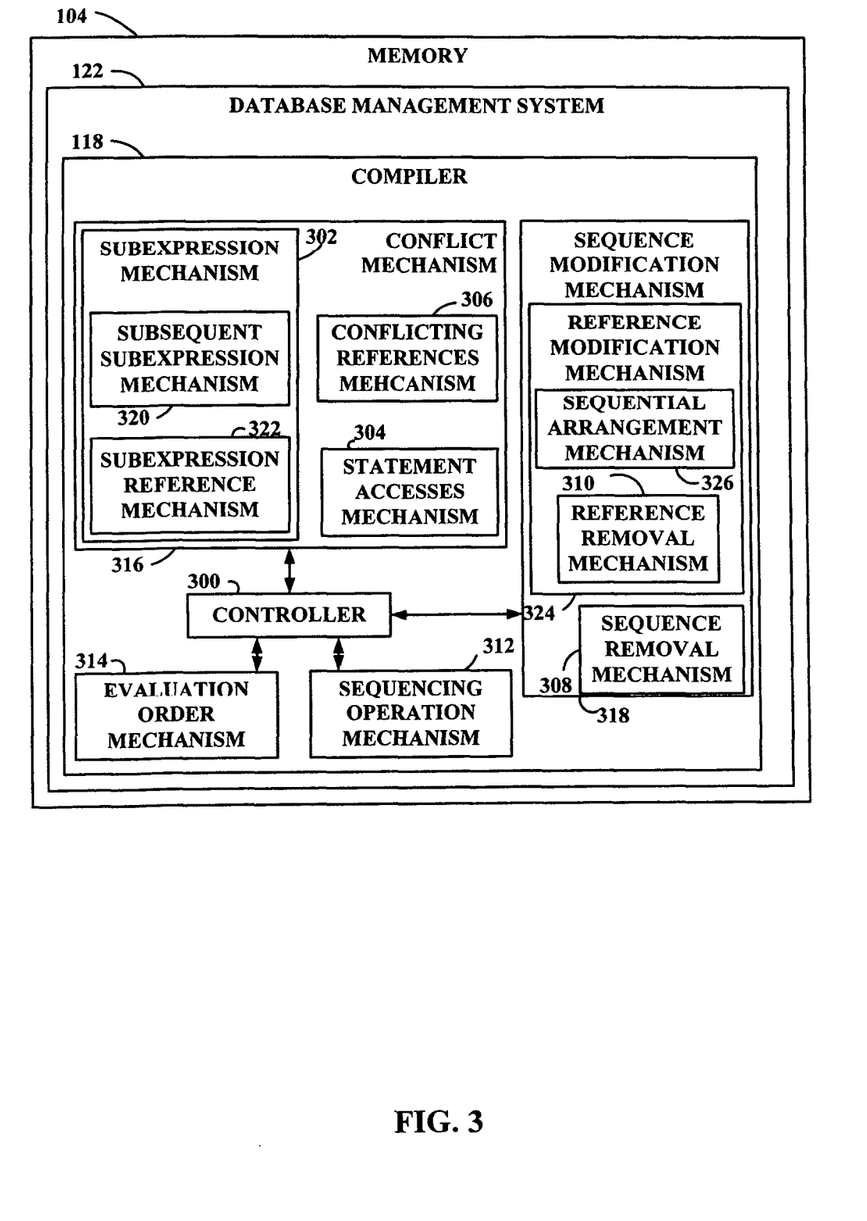
FIG. 3 illustrates functional components of the compiler in the DBMS of FIG. 1 for simplifying data flow in a statement with sequenced subexpressions.

FIG. 3 illustrates functional components of the compiler 118 of the DBMS 122 for simplifying data flow in the statement 114 having sequenced subexpressions. The compiler 118 comprises a controller 300, a conflict mechanism 316, a sequencing operation mechanism 312, a sequence modification mechanism 318, and an evaluation order mechanism 314.

The controller 300 manages the process of simplifying data flow for the statement 114 having sequenced subexpression. The compiler 118 processes the statement 114 by evaluating each statement separately. The controller 300 provides a current statement being evaluated to the sequencing operation mechanism 312. The sequencing operation mechanism 312 identifies all sequencing operations for the statement and selects one of the sequencing operations for processing. The sequencing operation mechanism 312 identifies the statement evaluation order for the sequenced subexpressions in the current statement based on the evaluation order. The evaluation order is provided to the controller 300.

The controller 300 provides the conflict mechanism 316 with the current statement and evaluation order. The conflicting mechanism 316 comprises a subexpression mechanism 302, a conflicting references mechanism 306 and a statement accesses mechanism 304. The subexpression mechanism 302 selects a sequenced subexpression for evaluation according to the evaluation order. If no sequenced subexpressions were previously selected then the sequenced subexpression first identified in the evaluation order is selected otherwise the next unselected sequenced subexpression in the evaluation order is selected. The subexpression mechanism 302 also locates all table accesses in the selected sequenced subexpression to form the access set. The selected sequenced subexpression and the access set are provided to the controller.

The subexpression mechanism 302 comprises a subsequent subexpression mechanism 320 and an subexpression reference mechanism 322. The subsequent subexpression mechanism 320 locates a first sequenced subexpression subsequent to the selected sequenced subexpression that contains a reference thereto and affirms execution thereof. The subexpression reference mechanism 322 determines the driving references to the selected sequenced subexpression in the first sequenced subexpression. The references form a reference set which is provided to the controller 300.

The statement accesses mechanism 304 locates all table accesses in the current statement other than those in the access set to form the other access set. The other access set are provided to the controller 300.

The conflicting references mechanism 306 is provided with the access set and the other access set for conflicting table access evaluation. The conflicting references mechanism 306 determines if there are pairs of conflicting table accesses between the access set and the other access set.

The conflicting references mechanism 306 coordinates modification of the current statement and sequencing operation based on the conflicting table accesses.

The evaluation order mechanism 314 also determines an evaluation order for each of conflicting table accesses between the access set and the other access set, and also an evaluation order between each access in the other access set and the references in the reference set.

The sequence modification mechanism 318 is provided with the internal representation to modify the sequencing operation. The sequence modification mechanism 318 comprises a sequence removal mechanism 308 and a reference modification mechanism 324. The reference modification mechanism 324 comprises a sequential arrangement mechanism 326 and a reference removal mechanism 310.

The sequential arrangement mechanism 326 also determines there is a reference in the reference set such that for all table accesses in the selected sequenced subexpression there is no intervening conflicting table access based on the evaluation order mechanism 314. If such an intervening conflicting table access in the other access set does not exist then the sequence modification mechanism 318 can modify the sequencing operation. The reference removal mechanism 310 removes the reference to the selected sequenced subexpression from the sequencing operation in such a case.

After the selected sequenced subexpression has been evaluated the sequence modification mechanism 318 evaluates the selected sequencing operation to determine if there is more than one reference therein. If the selected sequencing operation contains only one reference then the internal representation is provided to the sequence removal mechanism 308 where the selected sequencing operation is removed.

After processing the selected sequencing operation, the conflicting reference mechanism 306 provides the results to the controller where the current statement provided to the sequencing operation mechanism 312 for assessment as to whether or not all sequencing operations have been processed and selection of another sequencing operation.

The following are examples of simplifying data flow in a statement with conflicting table references in a common table expression.

EXAMPLE 1

```
WITH CTE0 as (select * from new table (Insert into Emp
    values ("John"), ("Dan")),
    CTE1 as (select * from EMP)
SELECT * from new table (Insert into MoveEmp (select *
    from CTE1));
```

In this example the sequencing operation references (1) CTE0, (2) CTE1, and (3) main SELECT (which also references CTE1). Both main SELECT and the sequencing operation reference CTE1 with no other table references in between the two. In the above example the sequencing operation is modified to reference (1) CTE0 and (2) main SELECT (which references CTE1). The reference to CTE1 in the sequencing operation is removed.

EXAMPLE 2

```
WITH CTE1 as (Select * from EMP)
SELECT * from new table (Insert into MoveEmp (select * from
    CTE1));
```

In this example the sequencing operation references (1) CTE1 and (2) main SELECT (which also references CTE1). Both main SELECT and the sequencing operation reference CTE1 with no other table references in between the two. In the above example the sequencing operation is modified to reference (1) main SELECT (which references CTE1). The reference to CTE1 in the sequencing operation is removed.

Since the first modification to the sequencing operation leaves only one subexpression sequenced, the sequencing operation is removed.

It is apparent to one skilled in the art that numerous modifications and departures from the specific embodiments described herein may be made without departing from the spirit and scope of the invention.

The invention claimed is:

1. A method of simplifying data flow in a database statement having a plurality of sequenced subexpressions, the method comprising:
    selecting one of a plurality of sequencing operations, wherein a first evaluation order for each of the plurality of sequenced subexpressions is specified in the selected sequencing operation;
    selecting one of the plurality of sequenced subexpressions according to the first evaluation order, wherein the plurality of sequenced subexpressions are specified through a WITH clause in the database statement and comprise at least one modification operation, wherein the modification operation modifies at least one table in a database;
    determining a first sequenced subexpression that includes a reference to the selected sequenced subexpression and affirms evaluation of the selected sequenced subexpression using a query graph model, wherein the first sequenced subexpression is subsequent to the selected sequenced subexpression according to the first evaluation order;
    searching the first sequenced subexpression for at least one driving reference to the selected sequenced subexpression, wherein the at least one driving reference forms a reference set;
    identifying table accesses in the selected sequenced subexpression to form a first access set;
    identifying all other table accesses in the database statement to form a second access set;
    identifying at least one conflicting table access between the first access set and the second access set, wherein each conflicting table access occurs when the database table is accessed at two separate conflicting points in the database statement, wherein a second evaluation order is determined for each conflicting table access between the first access set and the second access set, wherein a third evaluation order is determined between each access in the second access set and each driving reference in the reference set;
    determining whether each driving reference in the reference set has no table access in the second access set;
    determining whether each driving reference in the reference set and the identified table accesses in the selected sequenced subexpression are sequential with no identified conflicting table access;
    wherein in response to each driving reference having no table access in the second access set and each driving reference and the identified table accesses in the selected sequenced subexpression being sequential, modifying the database statement to remove a connection between the selected sequenced subexpression and the selected sequencing operation, wherein the connection includes the determined driving reference; and
    executing the modified database statement to retrieve data from the database.

2. The method of claim 1, further wherein each conflicting table access occurs when both of the table accesses write to a table or when one of the table accesses writes to the table and the other reads from the table.

3. A system for simplifying data flow in a database statement having a plurality of sequenced subexpressions, the system comprising:
    a processor coupled to a memory;
    a database;
    a sequencing operation mechanism that selects one of a plurality of sequencing operations, wherein a first evaluation order for each of the plurality of sequenced subexpressions is specified in the selected sequencing operation;
    a sequencing mechanism that selects one of the plurality of sequenced subexpressions according to the first evaluation order, wherein the plurality of sequenced subexpressions are specified through a WITH clause in the database statement and comprise at least one modification operation, wherein the modification operation modifies at least one table in the database;
    a subsequent subexpression mechanism that determines a first sequenced subexpression that includes a reference to the selected sequenced subexpression and affirms evaluation of the selected sequenced subexpression using a query graph model, wherein the first sequenced subexpression is subsequent to the selected sequenced subexpression according to the first evaluation order;

a subexpression reference mechanism that searches the first sequenced subexpression for at least one driving reference to the selected sequenced subexpression, wherein the at least one driving reference forms a reference set;

the subexpression mechanism that identifies table accesses in the selected sequenced subexpression to form a first access set;

a statement accesses mechanism that identifies all other table accesses in the database statement to form a second access set;

a conflicting references mechanism that identifies at least one conflicting table access between the first access set and the second access set, wherein each conflicting table access occurs when the database table is accessed at two separate conflicting points in the database statement, wherein an evaluation order mechanism determines a second evaluation order for each conflicting table access between the first access set and the second access set, wherein the evaluation order mechanism determines a third evaluation order between each access in the second access set and each driving reference in the reference set;

a sequential arrangement mechanism that determines whether at least one of the driving references in the reference set has no table access in the second access set;

the sequential arrangement mechanism that determines whether each driving reference in the reference set and the identified table accesses in the selected sequenced subexpression are sequential with no identified conflicting table access;

a sequence modification mechanism that modifies the database statement to remove a connection between the selected sequenced subexpression and the selected sequencing operation in response to each driving reference having no table access in the second access set and each driving reference and the identified table accesses in the selected sequenced subexpression being sequential, wherein the connection includes the determined driving reference; and a database management system that executes the modified database statement to retrieve data from the database.

4. The system of claim 3, further wherein each conflicting table access occurs when both of the table accesses write to a table or when one of the table accesses writes to the table and the other reads from the table.

5. A non-transitory computer readable medium encoded with a computer program for simplifying data flow in a database statement having a plurality of sequenced subexpressions, the computer program comprising instructions for:

selecting one of a plurality of sequencing operations, wherein a first evaluation order for each of the plurality of sequenced subexpressions is specified in the selected sequencing operation;

selecting one of the plurality of sequenced subexpressions according to the first evaluation order, wherein the plurality of sequenced subexpressions are specified through a WITH clause in the database statement and comprise at least one modification operation, wherein the modification operation modifies at least one table in a database;

determining a first sequenced subexpression that includes a reference to the selected sequenced subexpression and affirms evaluation of the selected sequenced subexpression using a query graph model, wherein the first sequenced subexpression is subsequent to the selected sequenced subexpression according to the first evaluation order;

searching the first sequenced subexpression for at least one driving reference to the selected sequenced subexpression, wherein the at least one driving reference forms a reference set;

identifying table accesses in the selected sequenced subexpression to form a first access set;

identifying all other table accesses in the database statement to form a second access set;

identifying at least one conflicting table access between the first access set and the second access set, wherein each conflicting table access occurs when the database table is accessed at two separate conflicting points in the database statement, wherein a second evaluation order is determined for each conflicting table access between the first access set and the second access set, wherein a third evaluation order is determined between each access in the second access set and each driving reference in the reference set;

determining whether each driving reference in the reference set has no table access in the second access set;

determining whether each driving reference in the reference set and the identified table accesses in the selected sequenced subexpression are sequential with no identified conflicting table access;

wherein in response to each driving reference having no table access in the second access set and each driving reference and the identified table accesses in the selected sequenced subexpression being sequential, modifying the database statement to remove a connection between the selected sequenced subexpression and the selected sequencing operation, wherein the connection includes the determined driving reference; and executing the modified database statement to retrieve data from the database.

6. The computer readable medium of claim 5, further wherein each conflicting table access occurs when the table accesses write to a table or when one of the table accesses writes to the table and the other reads from the table.

* * * * *